E. Cooper,
Hay Loader.
No. 88,945.
Patented Apr. 13, 1869.
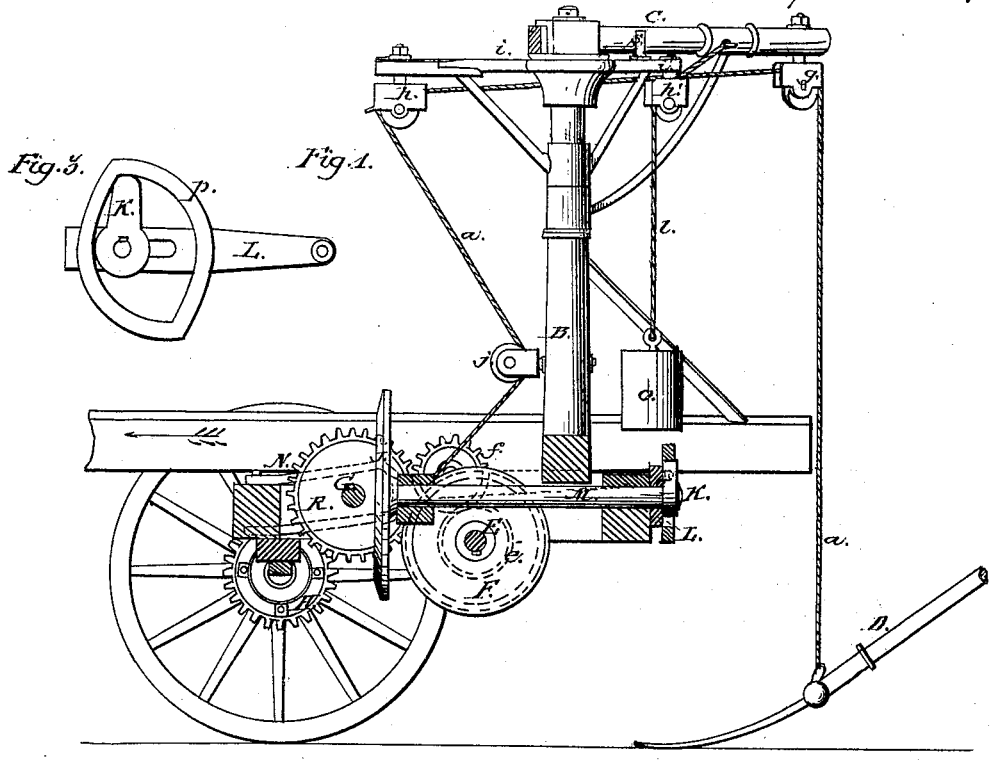
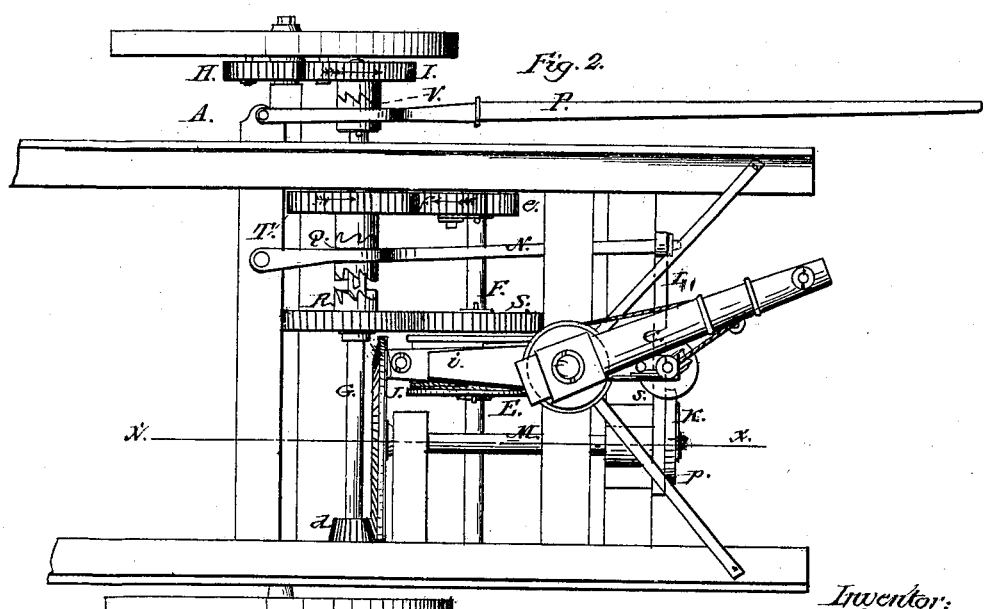
Attest:
P. T. Dodge
L. Hailer
Inventor:
E. Cooper
by Dodge & Munn
his atty

EMMETT COOPER, OF THERESA, NEW YORK.

Letters Patent No. 88,945, dated April 13, 1869.

IMPROVEMENT IN HAY-LOADERS.

The Schedule referred to in these Letters Patent and making part of the same.

*To all whom it may concern:*

Be it known that I, EMMETT COOPER, of Theresa, in the county of Jefferson, and State of New York, have invented certain new and useful Improvements in Apparatus for Loading Hay upon Wagons; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in an automatic hay-loader, for loading wagons in the field, and which is operated by a cog-wheel, secured to the inside of one of the hind wheels of the wagon, all as hereinafter described.

Figure 1 is a longitudinal vertical section through my machine, mounted on the rear end of a wagon, the section being taken on the line $x\ x$ of fig. 2.

Figure 2, a top plan view.

Figure 3, a view of the cam for reversing the motion of the drum.

The apparatus consists simply in a fork suspended from a derrick, which is mounted on the wagon, the said fork being operated by gearing connected with the wagon wheels, in such manner that it is allowed to drag behind the wagon on the ground, until filled with hay, and then hoisted up on the wagon, and after being emptied, allowed to descend again, the operation being automatic throughout.

In constructing my machine I provide a wagon, A, and mount thereon, at its middle, near the rear end, an upright post, B, provided with the two stationary horizontal arms, $i\ i'$, extending to the front and rear respectively.

On the upper end of this stationary post B, I pivot a horizontal arm, C, supported by suitable braces, so as to turn freely in a horizontal plane.

To the outer end of the swinging arm C, is suspended a pulley-block, $g$, and to the end of the arm $i$, I suspend another pulley, $h$, and over these I pass the rope $a$, and attach one end to a hay-fork, D, and pass the other through a stationary pulley, $j$, and down to a revolving drum, E, to which I secure its end, all as shown in figs. 1 and 2.

The drum E is secured rigidly to a horizontal shaft, F, extending across the wagon frame, and having also secured to it a large cog-wheel, S, near its middle, and a small one, $e$, at one end, as shown in fig. 1.

Across the wagon frame I mount another shaft, G, parallel with shaft F, and one end of which projects through outside of the frame, and has mounted on it, a loose wheel, I, meshing into a cog-wheel, or circle, H, which is secured on the inner end of the hub of the wagon wheel, as shown in figs. 1 and 2.

On the inner side of the wheel I, I form a series of teeth, as shown, and place on the shaft G adjoining said wheel, a clutch, V, playing on a spline on the shaft, and which may be connected or disconnected from wheel I, by operating the hand-lever P, which lever is pivoted to one side of the frame, and extends out horizontally to the rear, all as shown in fig. 1.

On the shaft G, inside of the frame, and near one end of the shaft, I place two loose cog-wheels, R and T, and form on their adjacent faces ratchet-teeth, and place on the shaft, between said wheels, the double clutch Q, sliding on a spline on the shaft, and operated by a lever, N, so as to engage with one or the other of the wheels R and T. The wheel R meshes into the wheel S on the shaft F, and the wheel T into the small pinion $f$, secured to the frame as shown, and which in turn gears into the fixed pinion $e$, on the end of shaft F.

When thus arranged, if the clutch V be connected, and the clutch Q engaged with wheel T, and the wagon started, the various wheels will be rotated in the directions shown by the red arrows, when the rope $a$ will unwind from the drum and the fork descend. If now the clutch Q be shifted, so as to engage with wheel R, the motion of the drum is reversed, and the fork drawn up.

To provide for the automatic shifting of the clutch Q, I connect the free end of its lever N with a bar, L, lying at right angles with the lever, which has bolted, on its opposite end, the vertical cam-plate $p$, and within which a cam, K, plays.

The cam K is attached to one end of a horizontal shaft, M, which lies above and at right angles to the shaft F, and is provided on its front end with the large bevel-wheel J, which meshes into the pinion $d$, which is fast on the shaft G, all as shown in figs. 1 and 2.

The parts are so adjusted that the clutch Q is moved, so as to allow the fork to descend the desired distance, and then the cam K will move bar L, and through the medium of the lever N, shift clutch Q and hoist the fork and its load, until it reaches the pulley $g$, when the rope will draw the arm C around over the wagon, when the clutch Q again shifts, the arm is drawn back by the weight O, and the fork descends.

The weight O is attached to the cord $l$, which passes through the pulley $h'$, and is attached to the side of the arm C, as shown.

On the upper side of the arm $i'$, I station a pin, $s$, which prevents the arm C from swinging entirely around, thus keeping the block $g$, to one side of the centre, so that the arm C will swing around easily when the fork reaches its highest point.

When it is desired to load from the opposite side of the wagon, the pin $s$ is removed, the arm C swung past, the pin replaced, and the rope $a$ thrown over; the machine will then load from that side.

When in use, the machine is driven over the field alongside of the windrows or cocks, the operator having hold of the fork handle, or of a cord connected to it.

In driving to or from the field, the clutch V is unshipped.

By the use of the small pinions e and f, the fork is caused to descend with double the speed of its ascent.

The cog-wheel H is secured to the wagon wheel by means of screw-bolts, having hooks on their outer ends, which clasp around the spokes, and may be removed when desired.

The machine, when thus constructed, is strong and simple, may be attached to an ordinary wagon, and will accomplish the work of several men.

Having thus described my invention,
What I claim, is—

1. The derrick, having the rigid arms i and i', with the pulleys h and h', and removable stop s, attached, and the swinging arm C, with the pulley g, and having the cords a and l, with weight O, all constructed and arranged to operate substantially as described.

2. The combination of the shaft G with the wheels T and R, with clutch Q, and shaft F with the wheels f e and S, and drum E, arranged to operate as herein set forth.

3. The reversing-device, consisting of the shaft M, operated by the wheel J, engaging with the pinion d, on shaft G, and the cam K, rod L, and lever N, connected to clutch Q, all constructed and arranged to operate substantially as and for the purpose described.

EMMETT COOPER.

Witnesses:
GEO. CORNWELL,
J. S. CORNWALL.